US007284073B2

(12) United States Patent
Matsushige et al.

(10) Patent No.: US 7,284,073 B2
(45) Date of Patent: Oct. 16, 2007

(54) DISK ARRAY APPARATUS AND DATA RELAY METHOD OF THE DISK ARRAY APPARATUS

(75) Inventors: Hiromi Matsushige, Hiratsuka (JP);
Hiroshi Suzuki, Sagamihara (JP);
Masato Ogawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/353,004

(22) Filed: Feb. 14, 2006

(65) Prior Publication Data

US 2006/0129711 A1 Jun. 15, 2006

Related U.S. Application Data

(63) Continuation of application No. 10/771,379, filed on Feb. 5, 2004.

(30) Foreign Application Priority Data

Nov. 28, 2003 (JP) ............................ 2003-400301

(51) Int. Cl.
*G06F 3/00* (2006.01)
*G06F 12/00* (2006.01)
(52) U.S. Cl. .................... 710/36; 710/74; 711/114; 361/600
(58) Field of Classification Search ............ 710/8–11, 710/36–45, 72–74; 711/113–114; 361/600, 361/679, 683, 685
See application file for complete search history.

(56) References Cited

U.S. PATENT DOCUMENTS 5,617,425 A  4/1997 Anderson 5,630,169 A  5/1997 Jackson
5,729,763 A  3/1998 Leshem (Continued)

*Primary Examiner*—Christopher Shin
(74) *Attorney, Agent, or Firm*—Reed Smith LLP; Stanley P. Fisher, Esq.; Juan Carlos A. Marquez, Esq.

(57) ABSTRACT

A disk array apparatus of the invention improves the quality of Fibre Channel signals corresponding to mounting positions of disk drives. The disk array apparatus comprises first to fourth groups of a plurality of disk drives each of which stores data; a first data relay device for connecting a first group of a plurality of data transfer paths wired in a direction orthogonally intersecting the row direction and to be connected to the first group of a plurality of disk drives through a first loop-like data transfer path; a second data relay device for connecting a second group of a plurality of data transfer paths wired in a direction orthogonally intersecting the row direction and to be connected to the second group of a plurality of disk drives through a second loop-like data transfer path; a third data relay device for connecting a third group of a plurality of data transfer paths wired in a direction orthogonally intersecting the row direction and to be connected to the third group of a plurality of disk drives through a third loop-like data transfer path; and a fourth data relay device for connecting a fourth group of a plurality of data transfer paths wired in a direction orthogonally intersecting the row direction and to be connected to the fourth group of a plurality of disk drives through a fourth loop-like data transfer path The first and third relay devices are interposed between the first and third groups of a plurality of disk drives. The second and fourth relay devices are interposed between the second and fourth groups of a plurality of disk drives.

25 Claims, 17 Drawing Sheets

U.S. PATENT DOCUMENTS

| | | | |
|---|---|---|---|
| 5,768,551 A * | 6/1998 | Bleiweiss et al. | 710/316 |
| 5,898,828 A | 4/1999 | Pignolet et al. | |
| 6,016,252 A | 1/2000 | Pignolet et al. | |
| 6,459,571 B1 * | 10/2002 | Carteau | 361/684 |
| 6,539,451 B1 * | 3/2003 | Zani et al. | 710/309 |
| 6,574,687 B1 * | 6/2003 | Teachout et al. | 710/38 |
| 6,628,513 B1 | 9/2003 | Gallagher et al. | |
| 6,629,216 B1 * | 9/2003 | Mulvey et al. | 711/154 |
| 6,665,743 B2 | 12/2003 | Benhase et al. | |
| 6,763,438 B2 * | 7/2004 | Ogawa et al. | 711/157 |
| 6,819,560 B2 | 11/2004 | Konshak et al. | |
| 6,853,546 B2 | 2/2005 | Rabinovitz | |
| 7,068,500 B1 * | 6/2006 | Beinor et al. | 361/685 |
| 2001/0014956 A1 | 8/2001 | Nagata et al. | |
| 2002/0194405 A1 | 12/2002 | Huang | |
| 2003/0233525 A1 | 12/2003 | Reeves | |
| 2004/0088482 A1 | 5/2004 | Tanzer et al. | |
| 2004/0153618 A1 | 8/2004 | Wang et al. | |
| 2004/0236906 A1 | 11/2004 | Matsushige et al. | |
| 2004/0236908 A1 | 11/2004 | Suzuki et al. | |
| 2004/0267829 A1 | 12/2004 | Hirakawa et al. | |
| 2005/0149668 A1 | 7/2005 | Suzuki et al. | |

* cited by examiner

ABCDEFGHIJKLMNOPQRSTUVWXYZ

Vlf = 1.0Vpp
Vhf = 1.0Vpp (≃0dB)
ISI = Vlf - Vhf ≃ 0dB

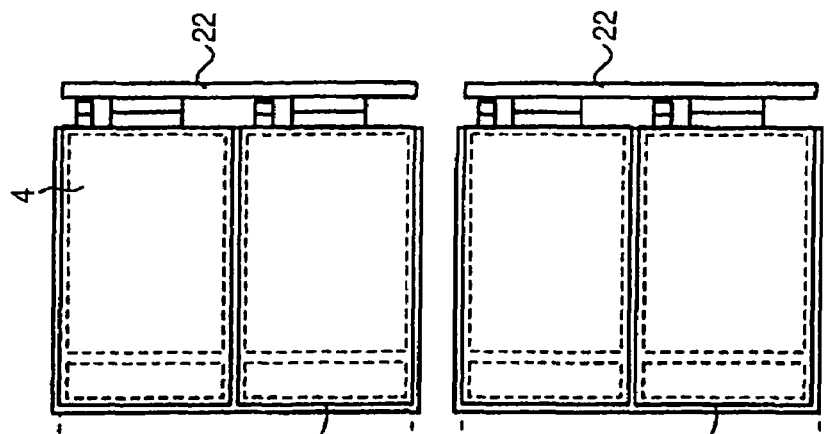
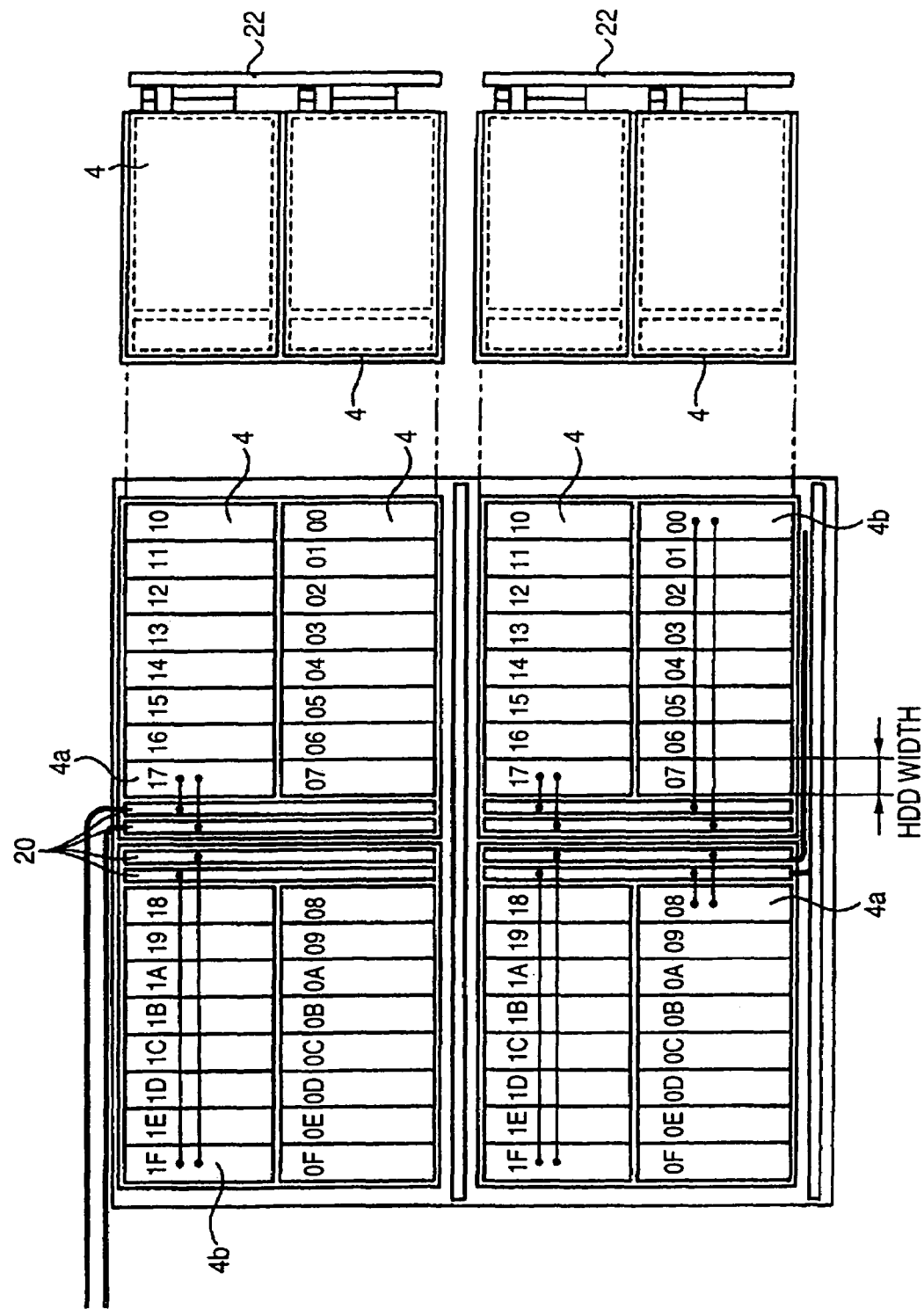

DISK ARRAY APPARATUS AND DATA RELAY METHOD OF THE DISK ARRAY APPARATUS

CROSS-REFERENCES TO RELATED APPLICATIONS

This application is a Continuation of U.S. application Ser. No. 10/771,379 filed on Feb. 5, 2004. Priority is claimed based on U.S. application Ser. No. 10/771,379 filed on Feb. 5, 2004, which claims priority to Japanese Patent Application No. 2003-400301, filed on Nov. 28, 2003, the entire disclosure of which is incorporated herein by reference.

BACKGROUND OF THE INVENTION

1. Field of the Invention

This invention relates to a disk array apparatus having a plurality of disk drives for storing data, controlling these disk drives and writing and reading out the data to and from a high order apparatus, and a data relay method of this disk array apparatus.

2. Description of the Related Art

Generally, a disk array apparatus having a plurality of disk drives for storing data, controlling these disk drives and writing and reading out the data to and from a CPU (Central Processing Unit) for an information processing unit (high order apparatus) comprising a computer having memories has been proposed.

This disk array apparatus includes a disk control apparatus and disk drive apparatuses. The disk control apparatus is arranged at the center and the disk drive apparatuses are arrange on both right and left sides. The disk control apparatus controls the overall disk array apparatus. Each of the disk drive apparatuses accommodates disk drives. Various devices such as hard disk drives and semiconductor memory devices can be used for the disk drives.

The disk control apparatus includes a management terminal, a control circuit unit, a cooling fan, a power source unit, and so forth. The management terminal is arranged on the front surface. An operator can perform maintenance and management of the disk array apparatus by using this management terminal.

The control circuit unit is the unit to which various devices for governing control of the overall disk array apparatus are mounted. The devices mounted include a channel adaptor (channel control unit), a disk adaptor (disk control unit), a cache memory, a shared memory, etc, that will be later described. The cooling fan is used for cooling the disk control apparatus. The power source unit supplies power that is necessary for operating the disk arrays.

A large number of disk drives are arranged in the disk drive apparatus. The disk drives are detachably accommodated inside a disk drive casing of the disk drive apparatus. The disk drives are accommodated not only on the front surface side of the disk array apparatus, that is, on the same side as the management terminal, but also on the rear surface side.

A patent reference 1 listed below discloses a disk array apparatus. The disk array apparatus has a plurality of hard disk drives (HDD) and controls data write/read to and from these hard disk drives by utilizing a Fibre Channel Arbitrated Loop (hereinafter called also "FC-AL loop") and a Port Bypass Circuit (hereinafter called also "PBC circuit").

FIGS. 18A and 18B show the arrangement of a plurality of disk drives 4 and a PBC board 20 having mounted thereto the PBC circuit 14 of a conventional disk array apparatus inside a disk drive casing 3a. Four PBC boards 20 are arranged at the center inside the disk drive casing 3a perpendicularly to the arrangement direction of the disk drives 4 and sixteen disk drives (hard disk drives) 4 each having a two-stage construction are arranged in the horizontal direction (row direction) on the right and left sides of these four PBC boards 20.

PBC circuits 14 formed by two LSI and constituting two systems are mounted to each of the four PBC boards 20 as shown in FIG. 19, a plurality of relay connector 21 interface-connecting to each of a plurality of disk drives 4 are mounted, and the PBC circuits 14 of the LSI and a plurality of relay connectors 21 are connected and wired with one another.

Connection between the relay connector 21 of the PBC board 20 and the ports of each disk drive 4 is made through a data transfer route using wirings 22a in the row direction and disposed on a rear surface substrate 22 fixed to the rear surface of a plurality of disk drives 4 as shown in FIG. 18B.

Patent Reference 1:
JP-A-2001-222385

Incidentally, communication at transfer rates of 1 Gbps and 2 Gbps has already been put into practical application in the FC-AL (Fibre Channel Arbitrated Loop) loop by employing a loop structure by serial transfer, and development of communication at 4 Gbps has now been under way.

The biggest problem for this high-speed serial transfer is the printed substrates such as the PBC boards 20 and the rear surface substrate 22. In such printed substrates, a dielectric loss becomes greater at a higher frequency in addition to a conductor loss and a skin effect and eventually a high frequency component attenuates which is equivalent to the case where the signal is passed through a low-pass filter.

Since the rise of a pulse subjected to band limitation gets dull, attenuation of short wavelength components and inter-symbol interference (ISI) develop and deteriorate signal quality of the Fibre Channel signals. A line width of an eye pattern on the reception side of the disk drives 4 and the PBC circuit 14 gets thick, noise and jitter become more vigorous and a bit error ratio (BER) drops due to the drop of the aperture ratio of the eye pattern.

As a result, the transfer loss becomes great in proportion to the wiring length and to the transfer frequency of the Fibre Channel signal transfer path on the printed substrate. In other words, attenuation of the Fibre Channel signal (FC signal) and the inter-symbol interference (ISI) become great in proportion to the wiring length L between the PBC circuit 14 and the disk drive 4 on the rear surface substrate 22 and quality of the Fibre Channel signal drops.

To cope with the drop of quality of the Fibre Channel signals described above in the conventional disk array apparatus, the PBC boards 20 having mounted thereto the PBC circuit 14 for connecting transmission/reception ports of a plurality of disk drives 4 in a loop form and transmitting and receiving the Fibre Channel signals are arranged at the center positions with respect to each of the disk drives 4 of mounting groups (sixteen groups, for example) arranged in the horizontal direction as shown in FIG. 18A. Therefore, the wiring lengths L in the horizontal direction between the disk drives 4 and the PBC circuits 14 on the rear surface substrate 22 are different depending on the mounting positions.

For instance, in the case of the disk drive 4a nearest to the PBC substrate 20, wiring can be made at the shortest wiring length of about 25.4 mm that is the width of the disk drive 4a as the wiring length L on the rear surface substrate 22. In the case of the disk drive 4b that is most spaced apart from this PBC board 20, on the other hand, the wiring length L on the rear surface substrate 22 is about 203.2 mm that is eight times the width of this disk drive 4, i.e. 25.4 mm. The wiring length L on the rear surface substrate 22 becomes greater in accordance with the number of disk drives 4 mounted.

In the conventional disk array apparatus, therefore, quality of the Fibre Channel signal varies in accordance with the mounting positions of the disk drives 4 on the back end. As the wiring length L on the rear surface substrate 22 becomes greater, attenuation of the high range components resulting from the transmission path loss, the drop of quality of the Fibre Channel signals resulting from the inter-symbol interference (ISI), and so forth, become greater.

In view of the problems described above, this invention aims at improving the drop of quality of the Fibre Channel signals in accordance with the mounting positions of the disk drives.

SUMMARY OF THE INVENTION

In a disk array apparatus according to the invention, a first data relay device and a third data relay device are interposed between a first group of a plurality of disk drives and a third group of a plurality of disk drives, a second data relay device and a fourth data relay device are interposed between a second group of a plurality of disk drives and a fourth group of a plurality of disk drives, and wirings of the first to fourth groups of a plurality of data transfer paths for connecting respectively the first to fourth loop-like data transfer paths of the first to fourth data relay devices and the first to fourth groups of a plurality of disk drives are arranged in a direction orthogonally intersecting a row direction.

In the invention, the wiring lengths from the first to fourth loop-like data transfer paths of the first to fourth data relay devices to the corresponding relay connectors are made substantially equal to one another.

In the invention, multiplexers of the first to fourth loop-like data transfer paths of the first to fourth data relay devices are dispersedly arranged in the row direction.

In the invention, buffer amplifiers are arranged at portions interposed respectively between each of the first to fourth loop-like data transfer paths of the first to fourth data relay device and the corresponding relay connector.

According to the invention, the wiring lengths of a plurality of data transfer paths between the loop-like data transfer paths and the disk drives can be relatively reduced irrespective of the number of disk drives mounted to thereby achieve a higher capacity, and the drop of signal quality resulting from various factors such as signal attenuation, inter-symbol interferences, and so forth can be improved.

According to the invention, the wiring lengths of data transmission/reception paths between the loop-like data transfer paths and the disk drives can be made uniform irrespective of the mounting positions of the disk drives. In consequence, the data error ratio (BER) can be rendered equal to one another irrespective of the mounting positions of the disk drives.

BRIEF DESCRIPTION OF THE DRAWINGS

FIG. 18 shows main portions of a disk array apparatus according to the prior art, wherein A is a front view and B is a side view.

DESCRIPTION OF THE PREFERRED EMBODIMENTS

A disk array apparatus and a data relay method of the disk array apparatus according to the preferred embodiments of the invention will be hereinafter explained with reference to the accompanying drawings.

Figure 1:
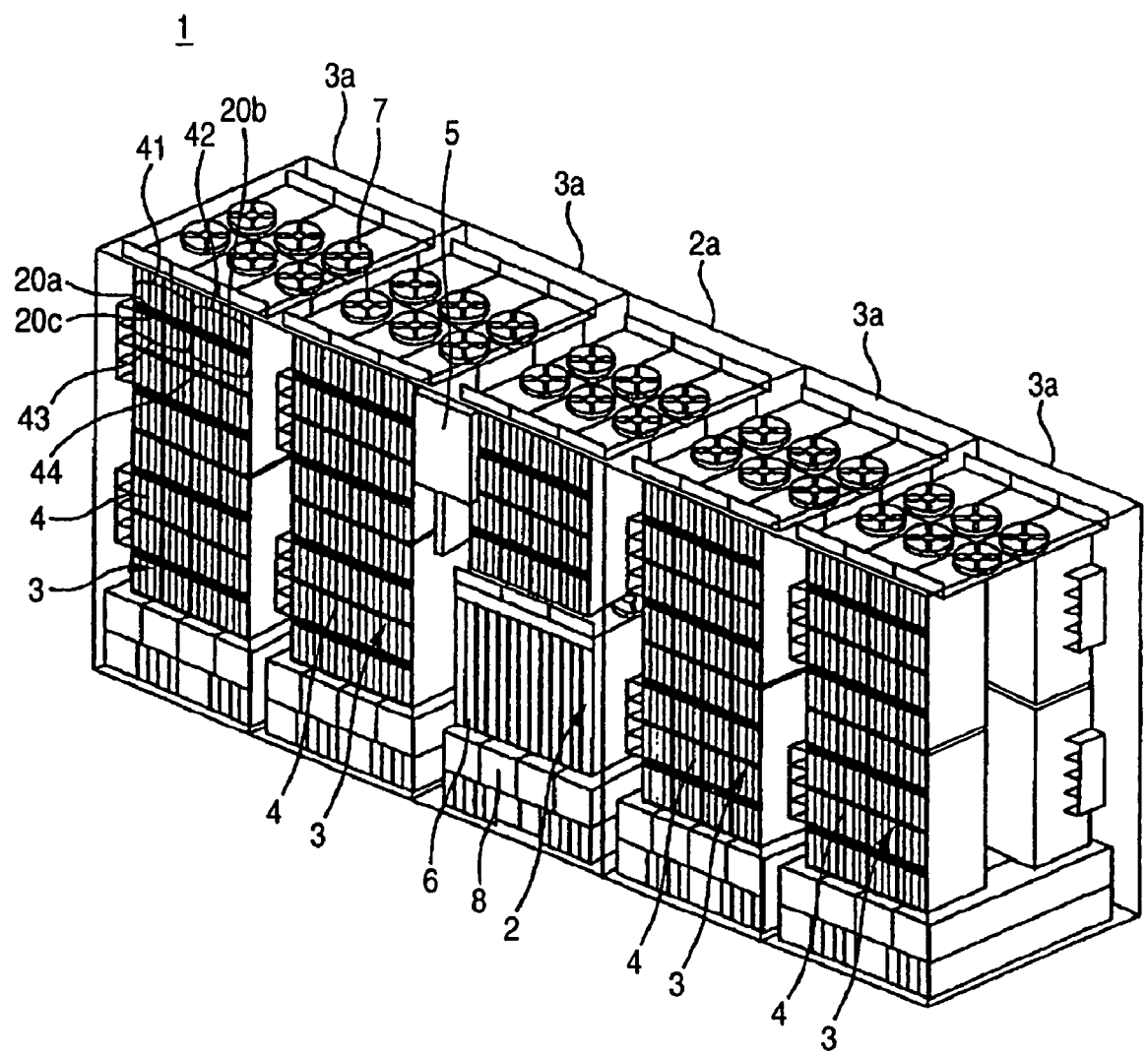
FIG. 1 is a perspective view showing overall appearance of a disk array apparatus according to the invention.

FIG. 1 shows appearance of an overall construction of the disk array apparatus according to an embodiment of the invention. The disk array apparatus 1 shown in FIG. 1 includes a disk control apparatus 2 and disk drive apparatuses 3. A controller casing 2a accommodating the disk control apparatus 2 is arranged at the center and disk drive casings 3a each accommodating the disk drive apparatus 3 are arranged on both right and left sides of the controller casing 2a. The disk control apparatus 2 controls the disk array apparatus 1 as a whole. The disk drive apparatus 3 has disk drives 4. Various means such as hard disk drives (HDD) and semiconductor memory devices can be employed for the disk drives 4.

The disk control apparatus 2 includes a management terminal 5, a control circuit unit 6, a cooling fan 7, a power source unit 8, and so forth. The management terminal 5 is arranged on the front surface of the disk control apparatus 2. In FIG. 1, the management terminal 5 has a form of a notebook type computer and includes a foldable display device and a keyboard device. An operator can perform maintenance and management of the disk array apparatus 1 by using this management terminal 5.

The control circuit unit 6 is the one to which various apparatuses for controlling the disk array apparatus 1 as a whole are fitted. The apparatuses to be fitted include, for example, a channel adaptor (channel control unit) 9, a disk adaptor (disk control unit) 10, a cache memory 11, a shared memory 12, and so forth that will be described elsewhere. The cooling fan 7 is used for cooling the disk control apparatus 2. The power source unit 8 supplies power that is necessary for operating the disk array apparatus 1.

Figure 2C:
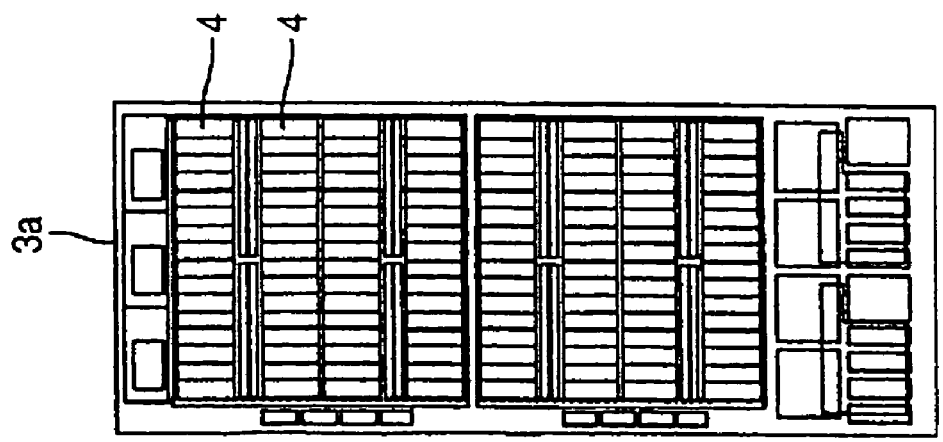
FIG. 2 shows an example of main portions of the invention, wherein A is a front view, B is a side view and C is a rear view.
Figure 2B:
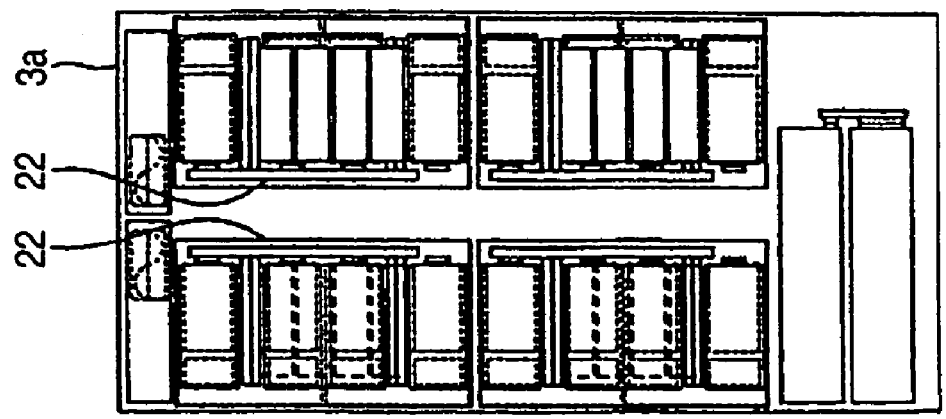
Figure 2A:
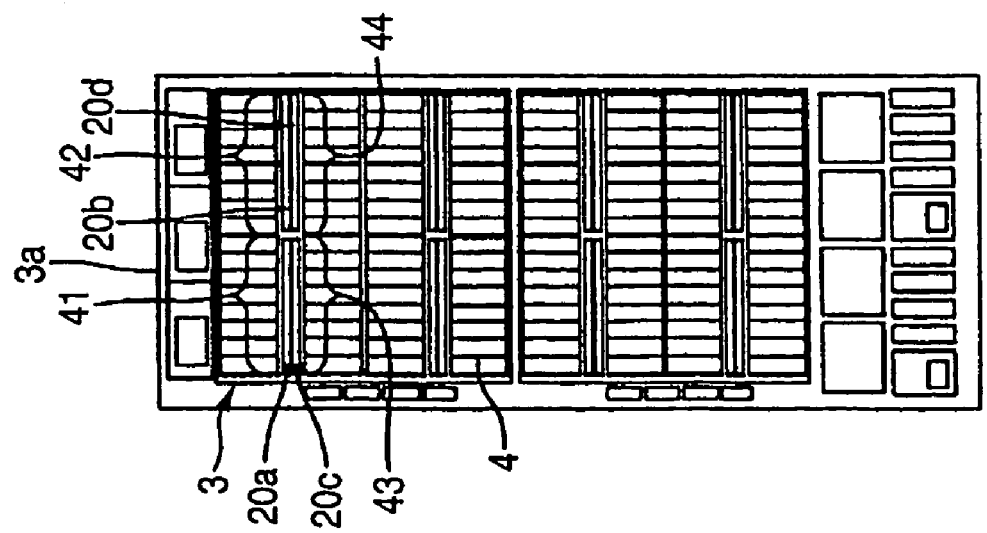

A large number of disk drives 4 are arranged in the disk drive apparatus 3. FIGS. 2A, 2B and 2C show a front surface, a side surface and a rear surface, respectively. Each disk drive 4 is detachably accommodated into the disk drive casing 3a of the disk drive apparatus 3. The disk drives 4 are accommodated not only on the front surface side of the disk array apparatus 1, that is, on the same side as the management terminal 5, but also on the rear surface side. An LED (Light-Emitting Diode) display unit is provided to display an operating condition of each disk drive 4 when the LED is turned ON or blinked.

Incidentally, the construction of the disk array apparatus 1 and the arrangement of its constituent elements are not limited to the content described above. For example, the management terminal 5 need not always be assembled into the disk array apparatus 1 but may be a computer at a remote place connected through a communication network. The management terminal 5 need not always be a notebook type computer but may assume the form of a desktop computer. The disk control apparatus 2 and the disk drive apparatus 3 may be constituted integrally with each other.

Figure 3A:
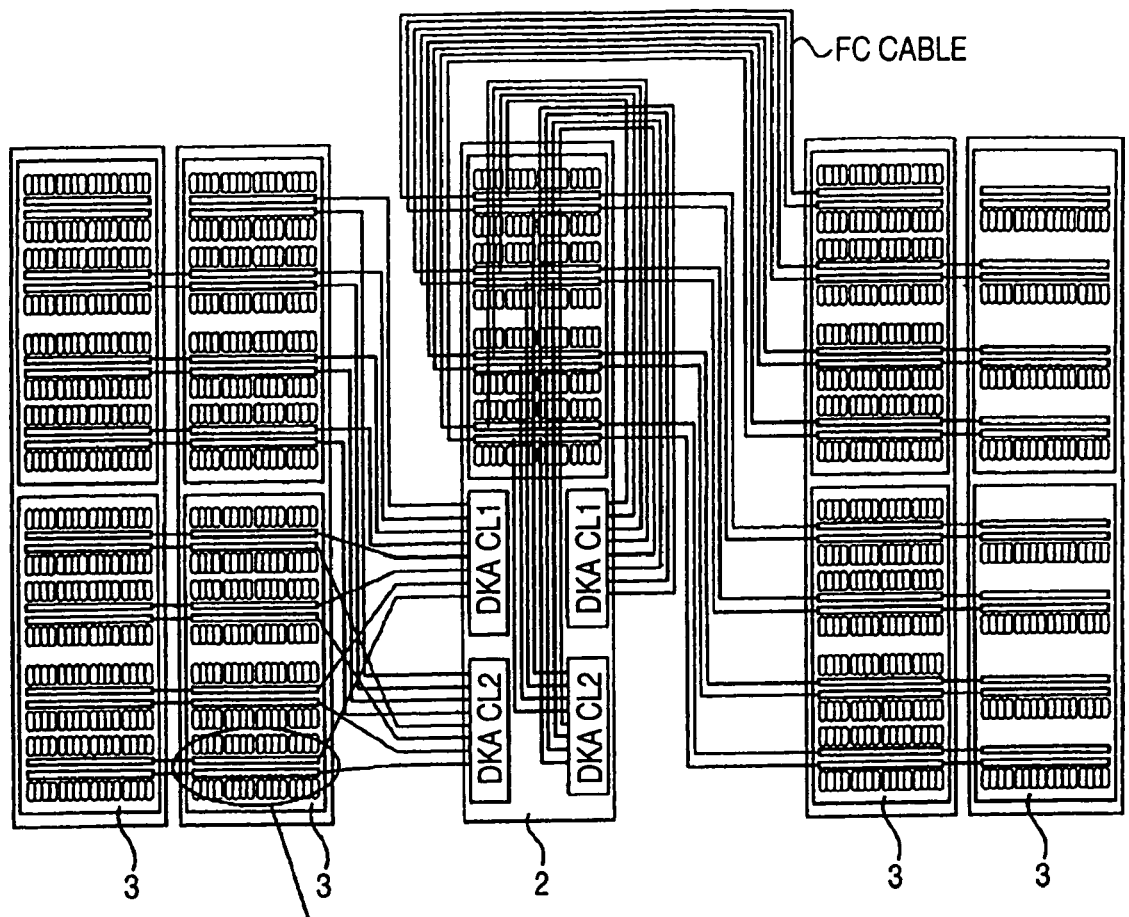
FIG. 3 is a wiring diagram showing an FC-AL connection example of the embodiment shown in FIG. 1.
Figure 3B:
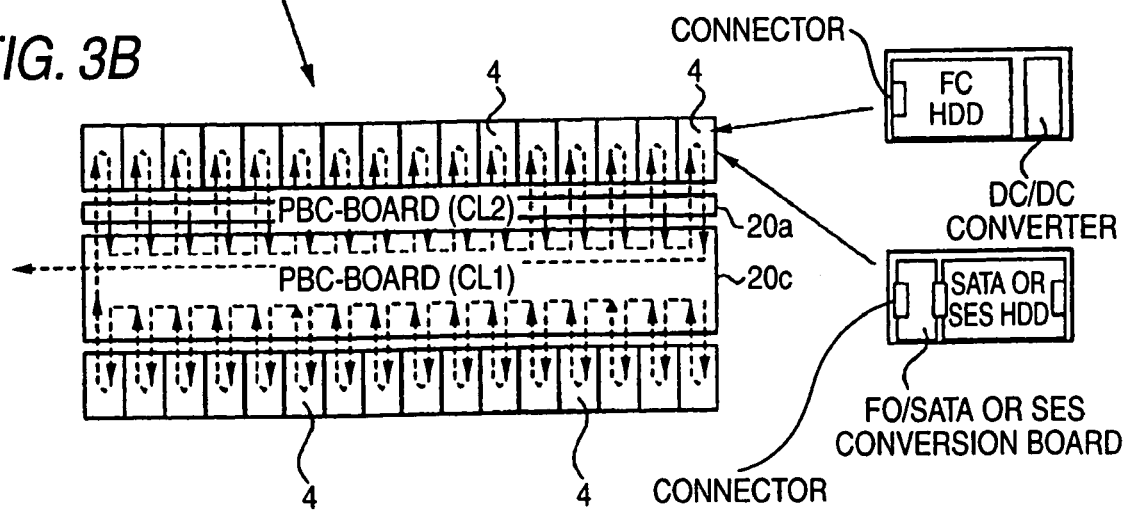

FIG. 3A shows an FC-AL connection construction between the disk control apparatus 2 of the disk array apparatus 1 and its disk drive apparatus 3. FIG. 3B is its partial enlarged view. To clarify the connection relation, CL1 (20c) of a PBC board 20 is illustrated while its direction is changed. FIG. 3B represents also that SATAHDD and SESHDD can be used as the disk drive 4 besides FCHDD.

This FC (Fibre Channel) HDD is a hard disk drive fabricated in accordance with the Fibre Channel standard and can be connected to the FC-AL loop, and its transfer rate is 1 to 2 Gbps.

The S (Serial) ATAHDD is a hard disk drive the parallel transfer system of the ATA specification of which is converted to a serial transfer system, can perform high-speed transfer (1.5 Gbps, for example) through a simple cable and is moreover economical.

When the SATAHDD is used as the disk drive 4, however, degradation of signal quality is greater than when the FCHDD is used. Therefore, greater effects can be obtained when a later-appearing embodiment of the invention is applied to the disk array apparatus using the SATAHDD as the disk drives 4.

The SES (SCSI Enclosure Services) HDD represents the disk drive 4 that has the function of connecting the disk adaptor 10 and the power source controller for controlling the supply of power of the disk drives 4 in such a fashion as to be capable of communicating with each other. The SESHDD has the functions of SES (SCSI Enclosure Services) and ESI (Enclosure Service I/F) stipulated in the SCSI3 (Small Computer System Interface 3) standard and can be operated as the SES or the ESI when predetermined signal pins of an interface connector of the SESHDD are wire.

Figure 4:
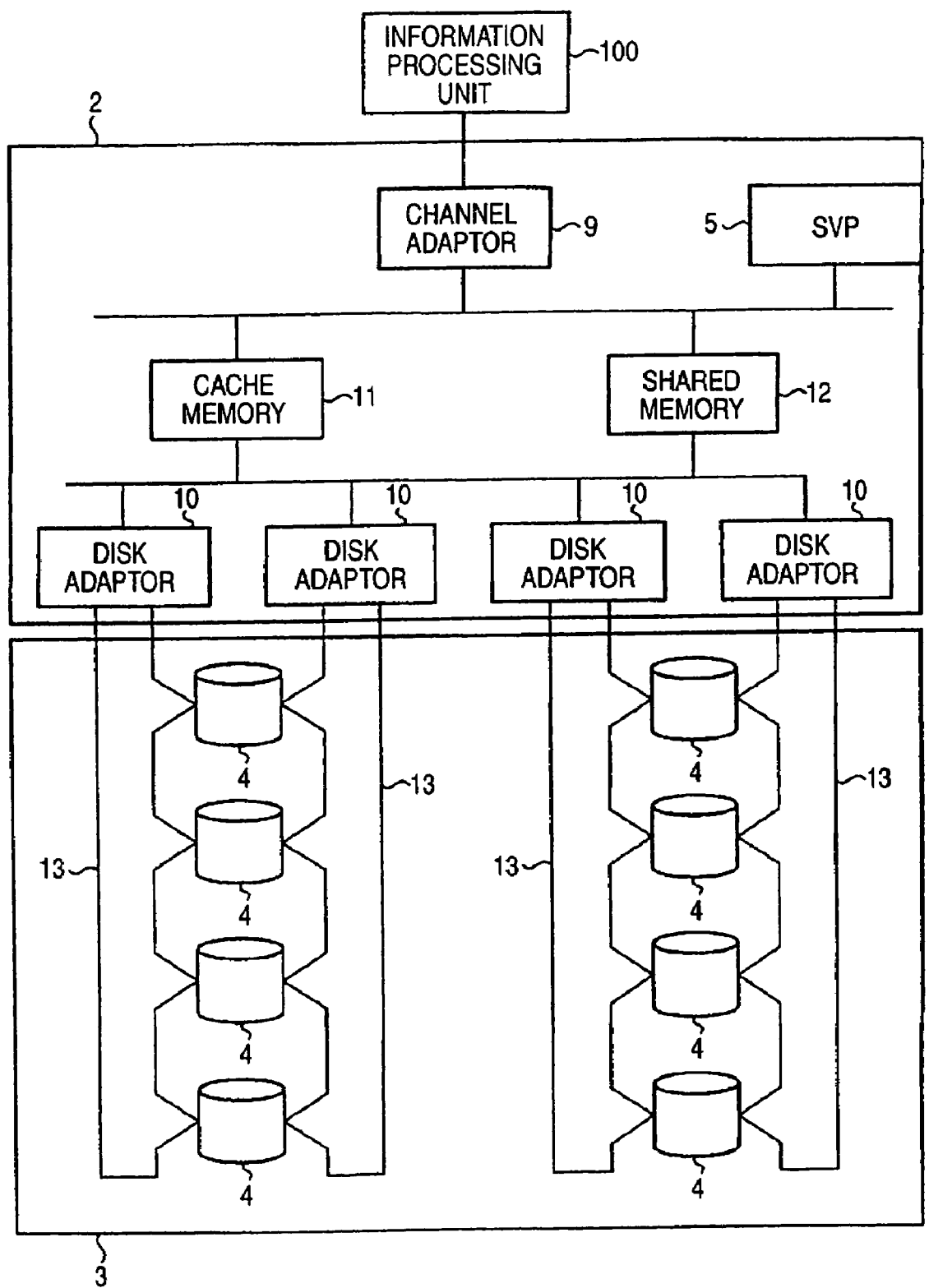
FIG. 4 is a block diagram of the embodiment shown in FIG. 1.

FIG. 4 is a block diagram showing the overall construction of this disk array apparatus 1.

The disk control apparatus 2 receives a data input/output request from an information processing unit 100, and then performs the data input/output with respect to data stored into the disk drive 4 equipped in the disk drive apparatus 3.

Here, an information processing unit 100 is a computer equipped with a CPU (Central Processing Unit) and memories. The CPU of the information processing unit 100 executes various kinds of programs to accomplish various functions. The information processing unit 100 can be utilized as a central computer of an ATM (Automatic Teller Machine) system of banks and an airplane ticket reservation system.

The disk control apparatus 2 includes a channel adaptor (channel control unit) 9, a cache memory 11, a shared memory 12, disk adaptors (disk control units) 10 and a management terminal (expressed as "SVP" in FIG. 4) 5.

The channel adaptor 9 has a communication interface with the information processing unit 100 and exchanges a data input/output request, etc, with the information processing unit 100. Incidentally, the channel adaptor 9 can be constituted in such a fashion as to exchange the data input/output request with a plurality of the information processing unit 100. In this case, a plurality of channel adaptors 9 can be provided to the disk control apparatus 2. The channel adaptor 9 and the information processing unit 100 may be connected to each other through a network.

The cache memory 11 and the shared memory 12 are those memories that store data and commands exchanged between the channel adaptor 9 and the disk adaptor 10. When the data input/output request received from the information processing unit 100 is a write request, for example, the channel adaptor 9 writes the write request into the shared memory 12 and also writes the write data received from the information processing unit 100 into the cache memory 11.

Then, the disk adaptor 10 reads out the write data from the cache memory 11 in accordance with the write request written into the shared memory 12 and writes the data into the disk drive 4.

The disk adaptor 10 executes the data input/output to and from the disk drive 4 by communicating with the disk drive 4. The data input/output operation is performed through a communication path 13 constituting a loop (hereinafter also called "FC-AL loop") determined by the FC-AL (Fibre Channel Arbitrated Loop) of the Fibre Channel standard as shown in FIG. 4. The communication rate is 1 Gbps or 2 Gbps determined by the Fibre Channel standard, for example, or may be other rate.

Incidentally, the channel adaptor 9, the disk adaptor 10, the cache memory 11 and the shared memory 12 need not always be disposed discretely as in this embodiment but may be constituted integrally with one another. At least some of them may be constituted integrally, too.

The channel adaptor 9, the disk adaptor 10, the cache memory 11 and the shared memory 12 can be connected to one another through a bus as shown in FIG. 4 or through switches. Furthermore, they may be connected through a network. In such a case, the network may be an LAN (Local Area Network).

Figure 5:
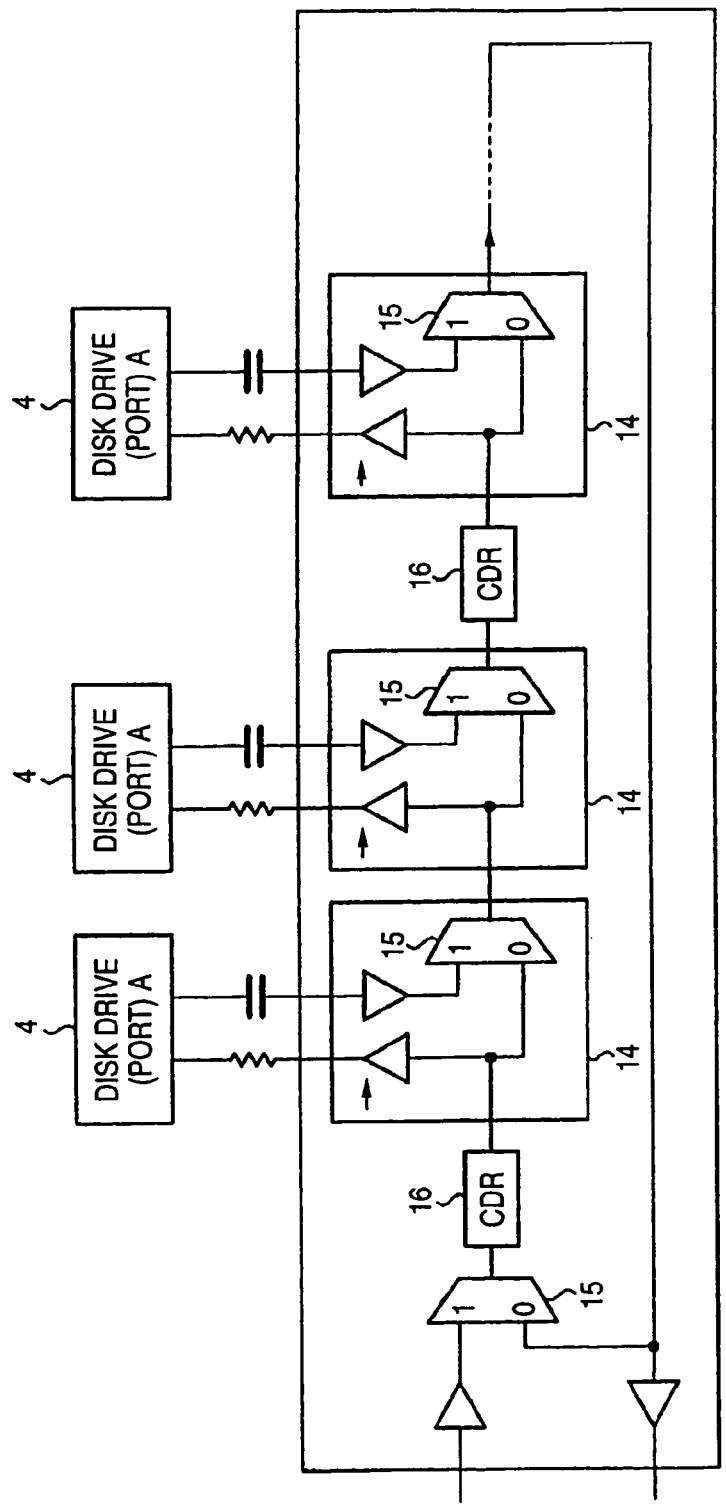
FIG. 5 is a wiring diagram showing an example of an FC-AL loop.

FIG. 5 is a connection diagram showing wiring from the disk adaptor 10 to the disk drives 4 through a communication path 13 constituting the FC-AL loop.

As shown in FIG. 5, the FC-AL loop can be constituted by connecting the disk adaptor 10, the disk drives 4 and a CDR (Clock Data Recovery) circuit 16 to multiplexers 15 provided to a PBC (Port Bypass Circuit) 14. The CDR circuit 16 is a circuit that suppresses distortion of data such as jitter of the data exchanged through the communication path 13.

A select signal of each multiplexer 15 selects either an input on the side represented by "1" or an input on the "0" side of the multiplexer 15. When the disk drive 4 is connected to the multiplexer 15, the select signal is inputted so that the input on the "1" side of the multiplexer 15 can be selected. When the disk drive 4 is not connected to the multiplexer 15, the select signal is inputted so that the input on the "0" side of the multiplexer 15 can be selected.

The PBC circuit 14 is used for cutting off the fault disk drive 4 from the FC-AL loop when any failure occurs in the disk drives 4. The disk adaptor 10 gives the cutoff instruction of the fault disk drive 4 from the FC-AL loop. A transmission method of such an instruction includes the case where the FC-AL loop is utilized and the case where a signal line connecting the disk adaptor 10 and the PBC circuit 14 is utilized.

When the occurrence of fault is detected in a certain disk drive 4, the select signal is inputted so that the input on the "0" side of the multiplexer 15 to which this fault disk drive 4 is connected can be selected. The input operation of the select signal of each multiplexer 15 can be made through the disk adaptor 10, the disk drive 4 or the CDR circuit 16 connected to the multiplexer 15 or may be concentratedly made from the disk adaptor 10, for example.

The number of multiplexer 15 provided to the PBC circuit 14 is not limited to the example shown in FIG. 5. When one PBC circuit 14 is provided to each of sixteen disk drives 4 aligned horizontally in the example of the disk drive apparatus 3 shown in FIG. 2, for instance, the number of multiplexers 15 provided to one PBC circuit 14 must be at least 17 in order to connect one disk adaptor 10 and maximum 16 disk drives 4 and to constitute the FC-AL loop.

The CDR circuit 16 can be constituted integrally with the PBC circuit 14. In the PBC circuit 14 shown in FIG. 5, for instance, the CDR circuit 16 may be constituted on the substrate that constitutes the PBC circuit 14 in the multiplexers 15 at both right and left sides.

To arrange the disk drives 4 inside the disk drive casing 3*a* in this embodiment, a first group of a plurality of, or eight, for example, disk drives 41 and a second group of a plurality of, or eight, for example, disk drives 42 are arranged in a row direction (in a transverse direction of the disk drive casing 3*a*), respectively, and a third group of a plurality of, or eight, for example, disk drives 43 and a fourth group of a plurality of, or eight, for example, disk drives 44 are arranged in a row direction in a different row from the first and second groups of the disk drives 41 and 42 as shown in FIGS. 1, 2A and 2C. All the disk drives 4 are arranged and accommodated in the same way as described above.

Figure 7:
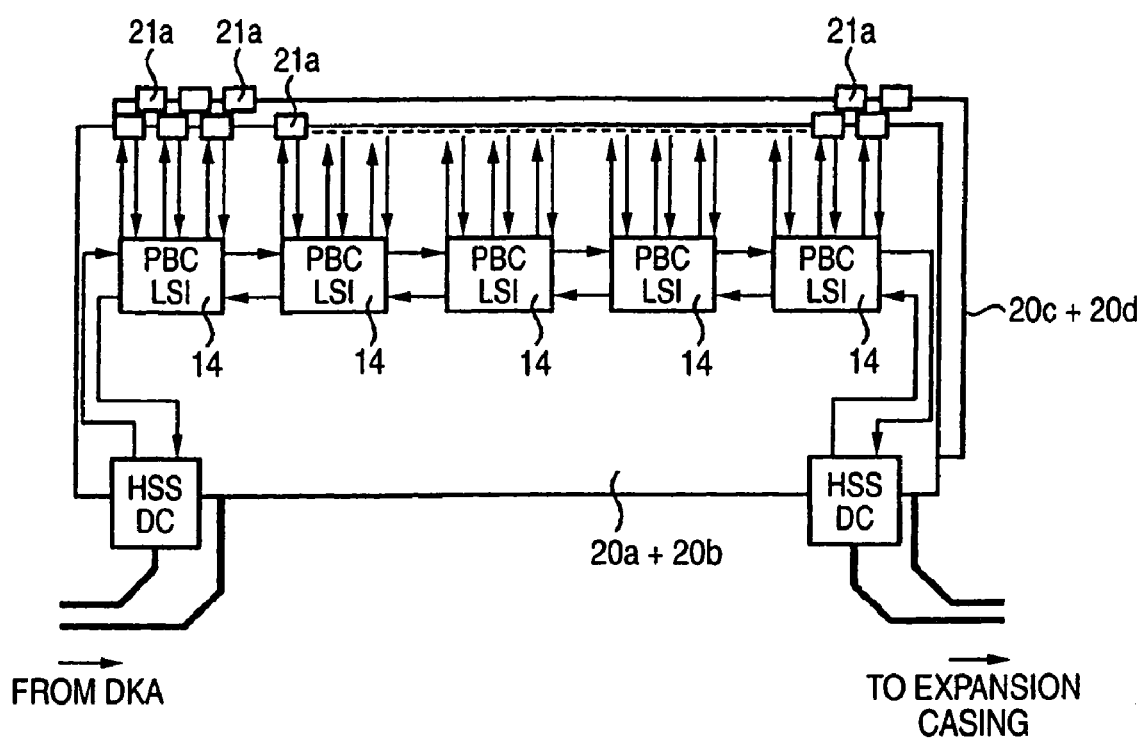
FIG. 7 is a structural view showing an example of a PBC board according to the invention.

In this embodiment, there are formed a first PBC board 20*a* having a first FC-AL loop (first loop-like transfer path) constituted by the PBC (Port Bypass Circuit) 14, the CDR circuit 16, etc, shown in FIGS. 5 and 7, a second PBC board 20*b* having a second FC-AL loop (second loop-like transfer path) constituted by the PBC 14, the CDR circuit 16, etc, a third PBC board 20*c* having a third FC-AL loop (third loop-like transfer path) constituted by the PBC 14, the CDR circuit 16, etc, and a fourth PBC board 20*d* having a fourth FC-AL loop (fourth loop-like transfer path) constituted by the PBC 14, the CDR circuit 16, etc.

As shown in FIGS. 1, 2A and 2C, the first and third PBC boards 20*a* and 20*c* are interposed between the first group of disk drives 41 and the third group of disk drives 43 and the second and fourth PBC boards 20*b* and 20*d* are interposed between the second group of disk drives 42 and the fourth group of disk drives 44.

In this embodiment, a plurality of relay connectors 21*a*, 21*a* and so on for respectively connecting first and fourth data transfer paths 22*b* connected to the first to fourth groups of disk drives 41 to 44 of the first to fourth PBC boards 20*a* to 20*d* are dispersedly arranged in the row direction (transverse direction) of the PBC boards 20*a* to 20*d* in such a fashion as to oppose each disk drive 4, 4 and so on as shown in FIG. 7. The example shown in FIGS. 6A, 6B and 7 represents the example where the first and second PBC boards 20*a* and 20*b* are integrated with each other and the third and fourth PBC boards 20*c* and 20*d* are integrated with each other.

In this embodiment, the wirings 22*b* of the first to fourth data transfer paths connecting the relay connectors 21 formed on the rear surface substrate 22 and the first to fourth disk drives 41 to 44 are assumed to extend in a direction orthogonally intersecting the row direction (longitudinal direction of the disk board casing 3*a*) as represented imaginarily and the length is set to a constant length of 50 mm, for example, that is substantially a half of the height of the disk drives 4.

In this case, the first to fourth data transfer paths 22*b* to be connected to the first to fourth groups of disk drives 41 to 44 are connected through the first to fourth loop-like data transfer paths, respectively and the data transferred from the disk adaptor 10 is serially transferred to the first to fourth data transfer paths 22*b* through the first to fourth loop-like data transfer paths (FC-AL loop).

In this embodiment, the multiplexers 15 of the PBC circuits 14 of the first to fourth loop-like data transfer paths of the first to fourth PBC boards 20*a* to 20*d* are dispersedly arranged in the row direction (transverse direction) and the wiring length of a plurality of relay connectors 21*a*, 21*a* and so on corresponding to the multiplexers 15 of the PBC circuits 14 of the first to fourth loop-like transfer paths is set to be substantially equal.

Figure 16:
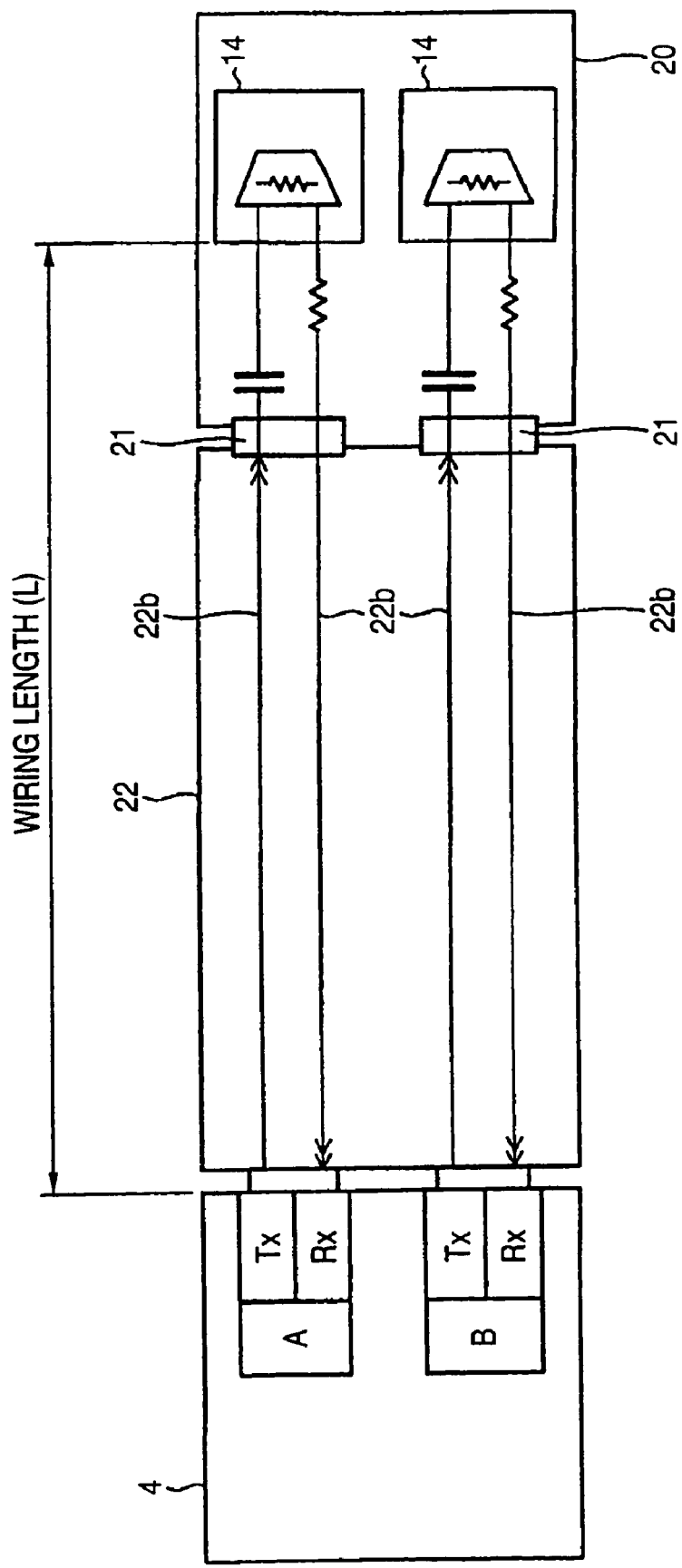
FIG. 16 is a structural diagram showing a connection example of a back surface substrate.

According to this embodiment, the first and third PBC boards 20*a* and 20*c* are arranged horizontally between the first and third groups of disk drives 41 and 43 and the second and fourth PBC boards 20*b* and 20*d* are arranged horizontally between the second and fourth groups of disk drives 42 and 44. Therefore, the wiring of the first to fourth loop-like data transfer paths (FC-AL loop) of the first to fourth PBC boards 20*a* to 20*d* and the wiring of the first to fourth data transfer paths for connecting the first to fourth disk drives 41 to 44 are set to the direction orthogonally intersecting the row direction, and the respective wiring can be set to a relatively small length such as 50 mm. In other words, the length L of the wiring 22*b* on the rear surface substrate 22 between the PBC circuit 14 and the disk drive 4 can be set to the same length such as 50 mm as shown in FIG. 16.

Figure 8:
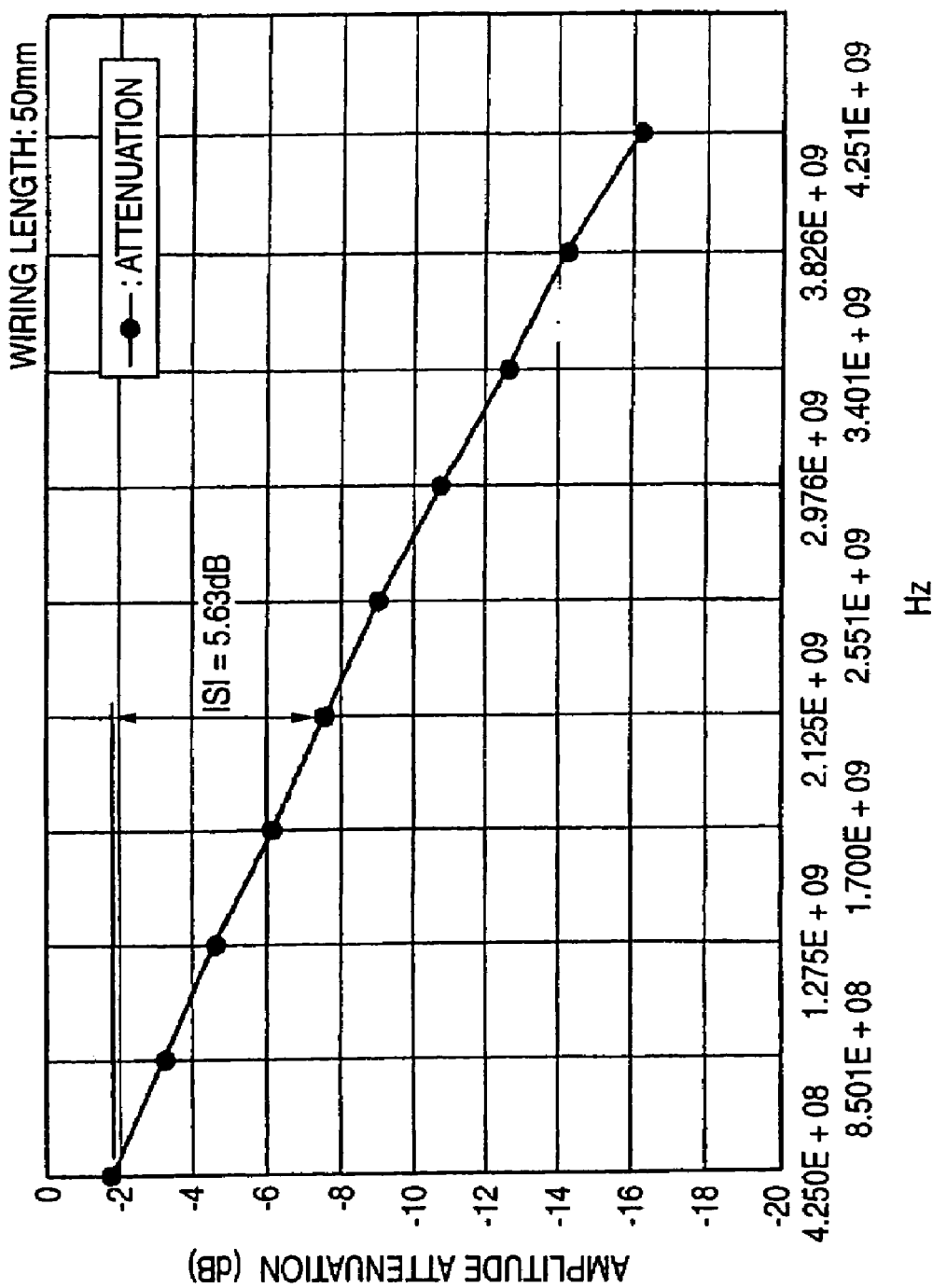
FIG. 8 is a graph useful for explaining the invention.

When the wiring length is set to 50 mm, for example, inter-symbol interferences (ISI) can all be set to the same value of −5.63 dB in an ordinary printed substrate as shown in FIG. 8. FIG. 8 shows the transfer rate and amplitude attenuation characteristics when the wiring length is 50 mm.

Therefore, this embodiment can reduce relatively the wiring length of a plurality of data transfer paths 22*b* between the loop-like data transfer path and the disk drives 4 irrespective of the increase of the mounting number of the disk drives 4 for increasing the capacity and can improve the drop of signal quality resulting from various factors such as signal attenuation and inter-symbol interference (ISI).

Since this embodiment can make uniform the wiring length of the loop-like data transmission/reception transfer path 22*b* between the data transfer path and the disk drives irrespective of the mounting position of the disk drives 4, the embodiment can make equal a data error rate (BER).

According to this embodiment, the first to fourth PBC boards 20*a* to 20*d* are mounted in the horizontal direction to a plurality of disk drives 41 to 44 arranged in the row direction and the wiring region of the FC-AL loop can be enlarged. Therefore, the embodiment can reduce as much as possible impedance mismatching portions such as through-holes and via-holes and can eliminate the factors of the drop of signal quality such as signal reflection and cross-talk.

Figure 9:
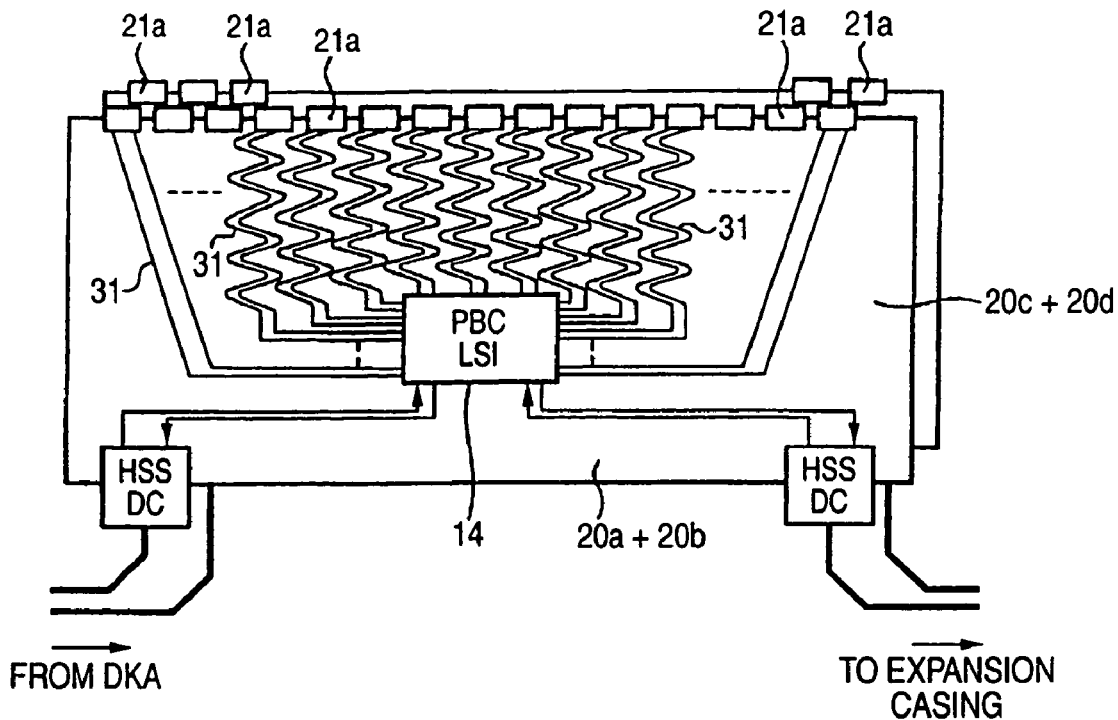
FIG. 9 is a structural view showing another example of the PBC board according to the invention.

Incidentally, the embodiment shown in FIG. 7 represents the case where the PBC circuits 14 (multiplexers 15) of the PBC boards 20a to 20d are dispersedly arranged in the row direction. However, a plurality of PBC circuits 14 and a plurality of multiplexers 15 shown in FIGS. 5 and 7 may be constituted into a multi-port PBC circuit 14 comprising one high integration circuit (LSI) as shown in FIG. 9. In this case, the wiring length of the wirings 31 from the first to fourth loop-like data transfer paths (FC-AL loop) of the PBC boards 20a to 20d shown in FIG. 9 to the corresponding relay connectors 21a, 21a and so on is made substantially equal. The wiring 31 of each of the respective PBC boards 20a to 20d forms one FC-AL loop.

Figure 10:
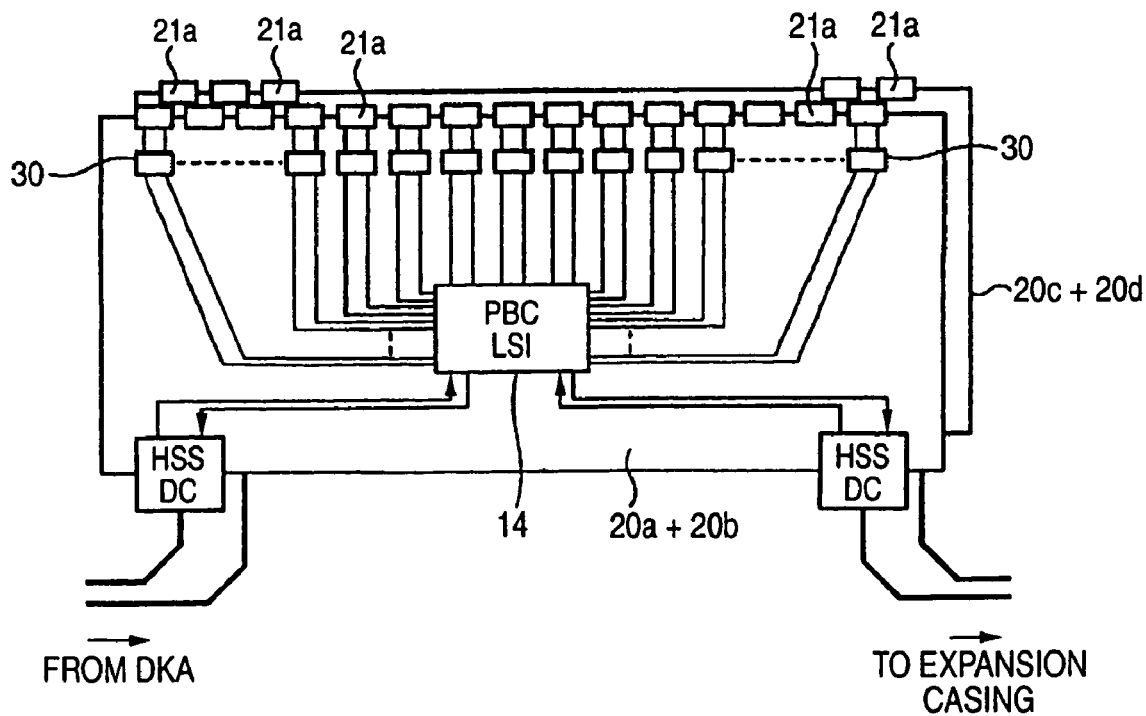
FIG. 10 is a structural view showing still another example of the PBC board according to the invention.
Figure 11:
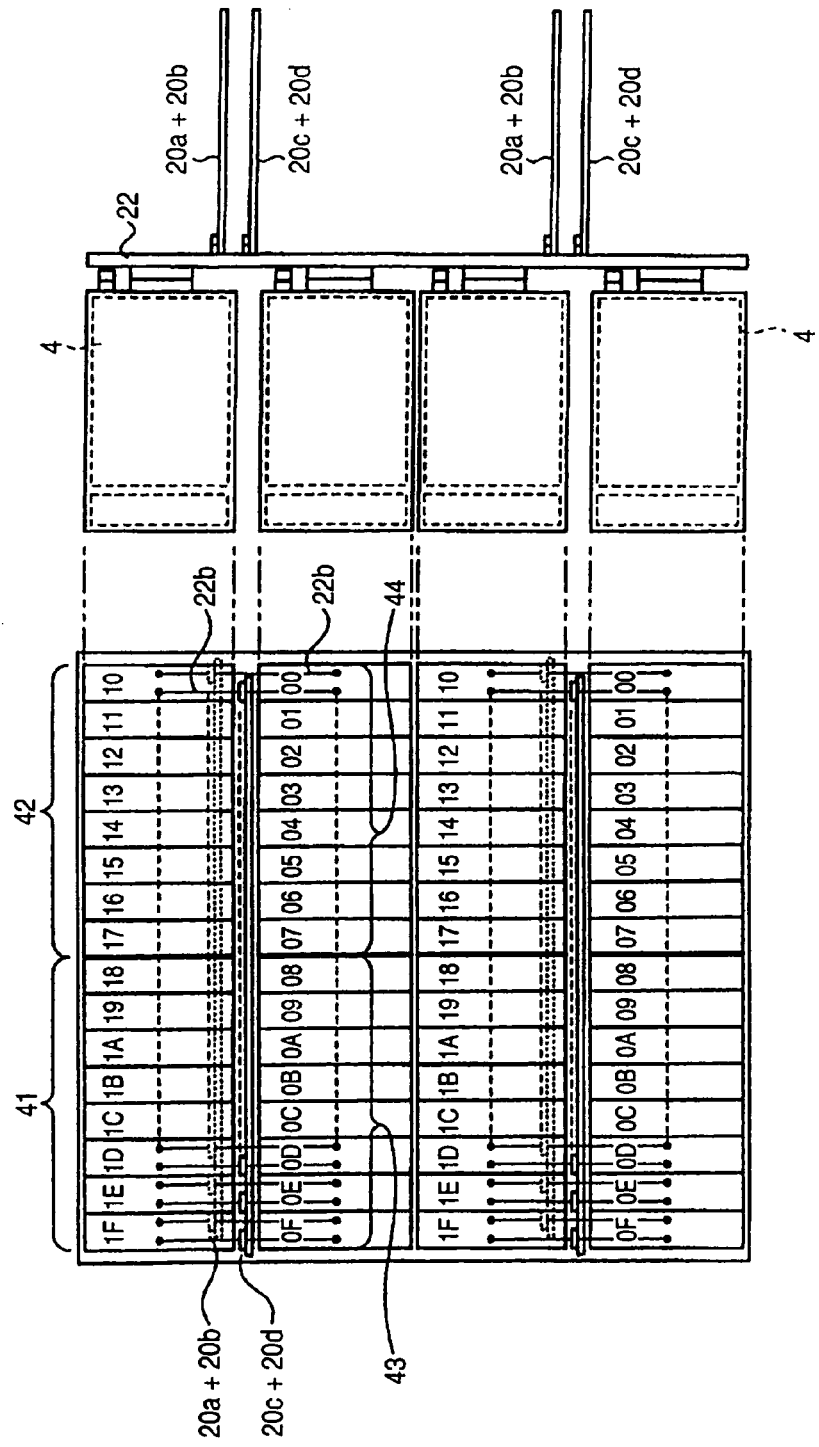
FIG. 11 shows another example of main portions of the invention, wherein A is a front view and B is a side view.

When one multi-port PBC circuit 14 is used, buffer amplifiers 30, 30 and so on each may be interposed as shown in FIG. 10 between a plurality of relay connectors 21a, 21b and so on corresponding to the first to fourth loop-like data transfer paths of the first to fourth PBC boards 20a to 20d the corresponding relay connectors 21, 21a and so on in place of the example shown in FIG. 9.

The examples shown in FIGS. 9 and 10 can acquire the same function and effect as that of the example shown in FIG. 7. When any fault occurs in the disk drives 4, the PBC circuit 14 is used to cut off the fault disk drive 4 from the FC-AL loop. When the data is transferred from the disk drive adaptor 10 to the disk drive 4 as the data storage destination or vice versa, the transfer characteristics in the PBC circuit 14 become constant and effective irrespective of the mounting positions of the disk drives 4.

In the embodiment described above, the first and third PBC boards 20a and 20c are interposed between the first group of disk drives 41 and the third group of disk drives 43 and the second and fourth PBC boards 20b and 20d, between the second group of disk drives 42 and the fourth group of disk drives 44. In place of this arrangement, it is also possible to arrange (fix) the first and third PBC boards 20a and 20c to an opposite surface (at the back) to the disk drive side of the corresponding rear surface substrate 22 between the first group of disk drives 41 and the third group of disk drives 43 in such a fashion as to intersect orthogonally (horizontal direction) the rear surface substrate 22 and to arrange (fix) the second and fourth PBC boards 20b and 20d to an opposite surface (at the back) to the disk drive side of the corresponding rear surface substrate 22 between the second group of disk drives 42 and the fourth group of disk drives 44 in such a fashion as to intersect orthogonally (horizontal direction) the rear surface substrate 22.

It could be easily understood that the same function and effect as described above can be obtained in this case, too.

Figure 12:
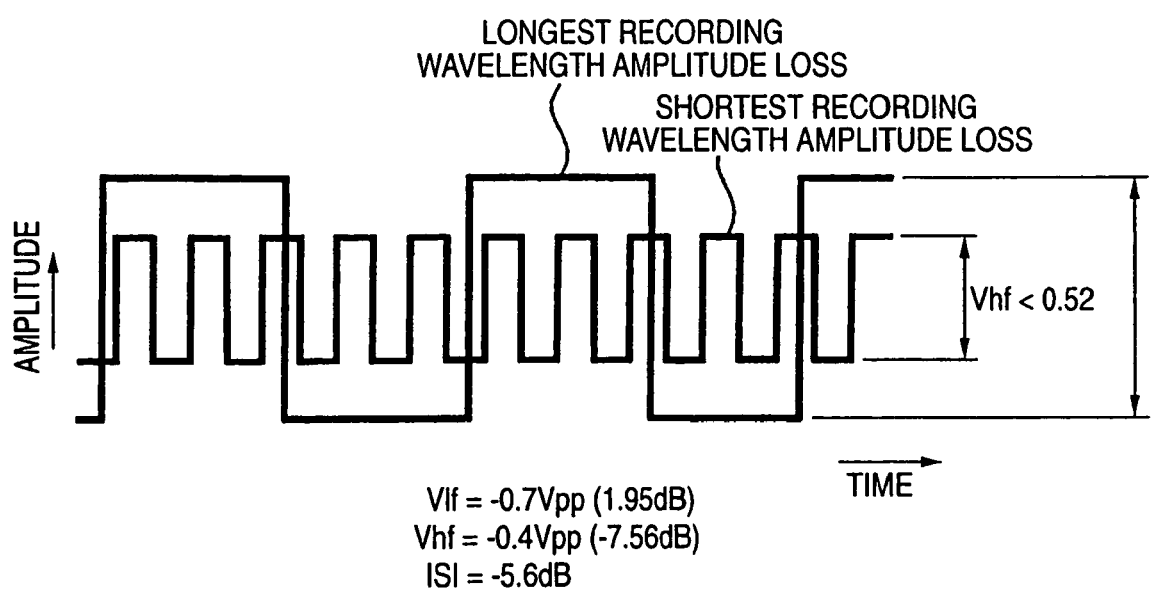
FIG. 12 is a diagram useful for explaining the invention.
Figure 17:
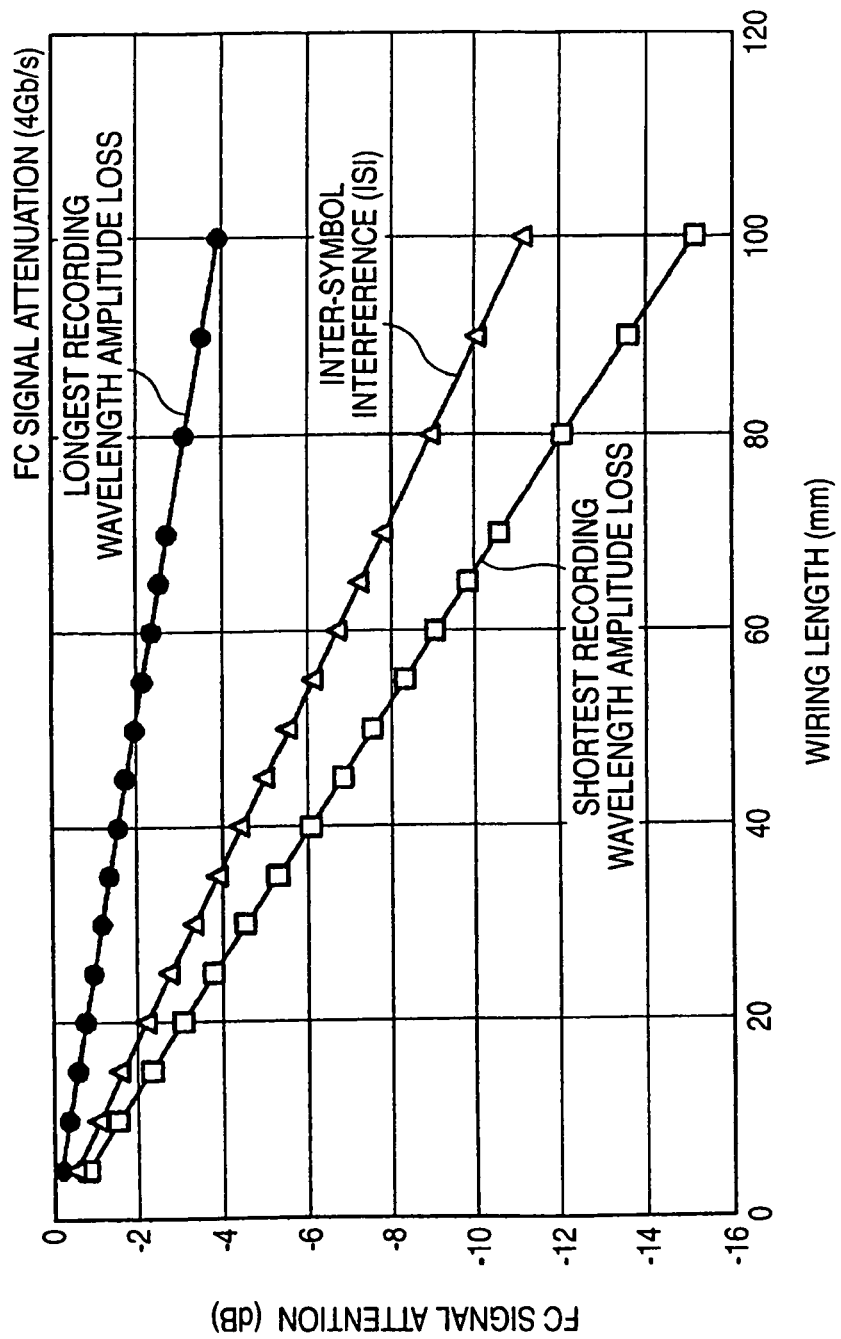
FIG. 17 is a graph showing the relation between FC signal attenuation and a wiring length.
Figure 19:
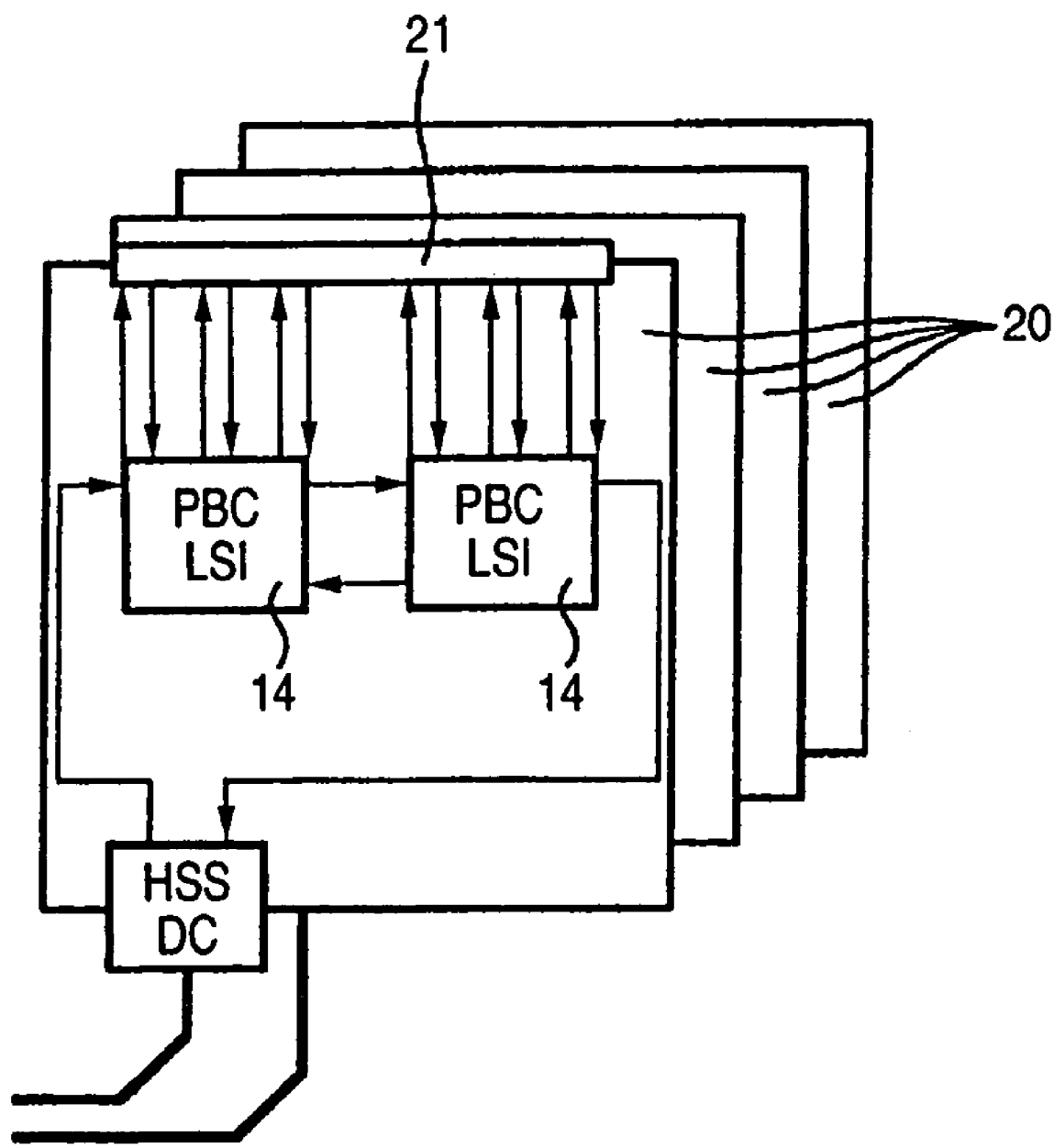
FIG. 19 is a structural view showing an example of PBC board according to the prior art.

Incidentally, when the number of disk drives 4 increases and the FC-AL loop of 4 Gbps is used in the disk array apparatus and when the length of the wirings 22b connecting to the direction orthogonally intersecting the row direction of the rear surface substrate 22, and constituting the first to fourth groups of data transfer paths connected to the first to fourth groups of disk drives 41 to 44 is set to 50 mm, for example, attenuation of the longest recording wavelength and attenuation of the shortest recording wavelength between the transmission side (on the side of the PBC boards 20a to 20d or on the side of each disk drive 4) and the reception side (on the side of each disk drive 4 or on the side of the PBC boards 20a to 20d) are different as shown in FIGS. 17 and 12. FIG. 17 shows the relation between the wiring length of the wiring 22b of the rear surface substrate (printed substrate) 22 and the FC signal (4 Gbps) and the inter-symbol interference (ISL). FIG. 17 represents that amplitude attenuation of the shortest recording wavelength is greater than that of the longest recording wavelength and the difference becomes greater with the increase of the wiring length. FIG. 12 shows its wave form.

Figure 6:
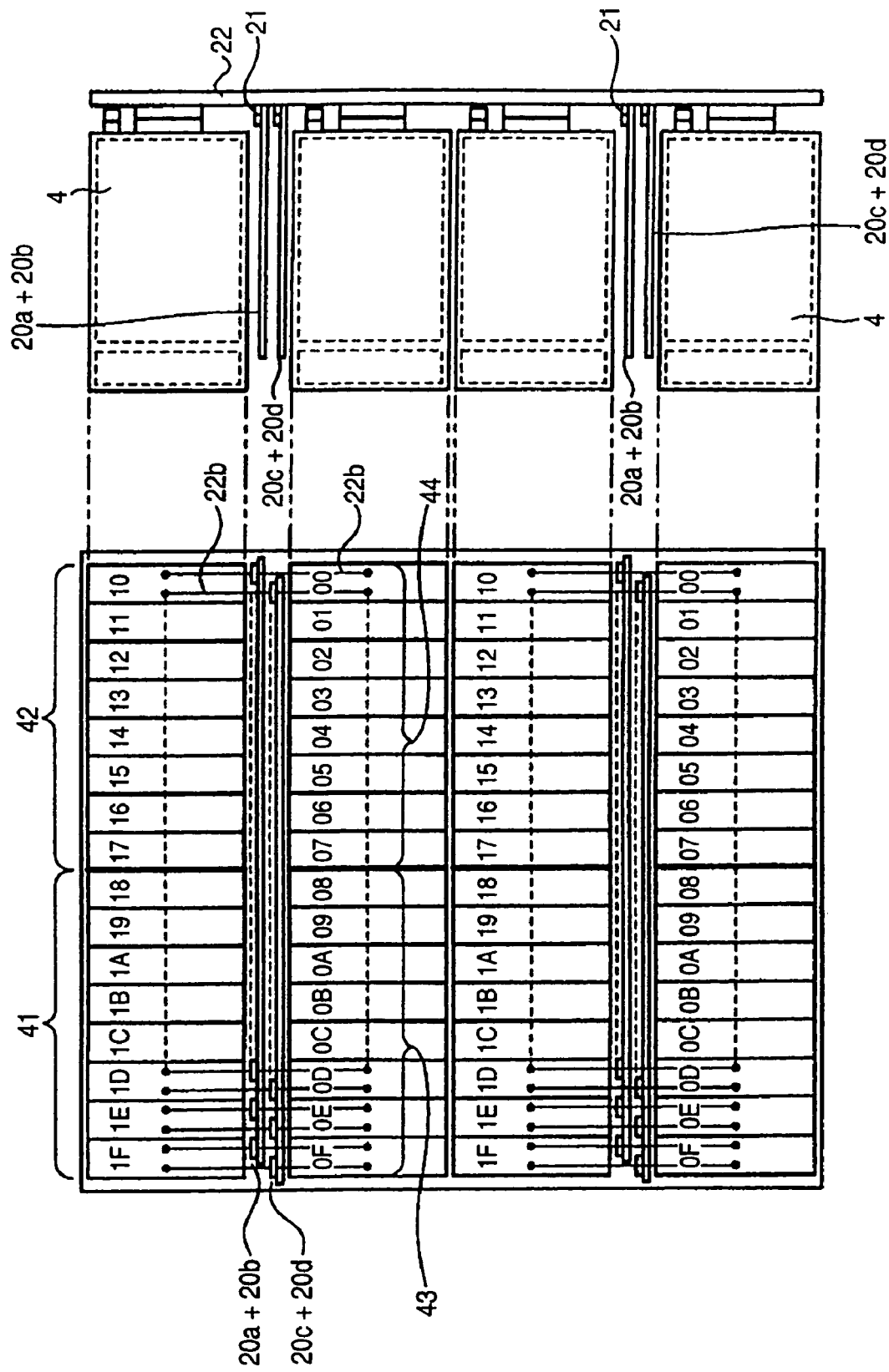
FIG. 6 shows an example of main portions of the invention, wherein A is a front view and B is a side view.
Figure 13:
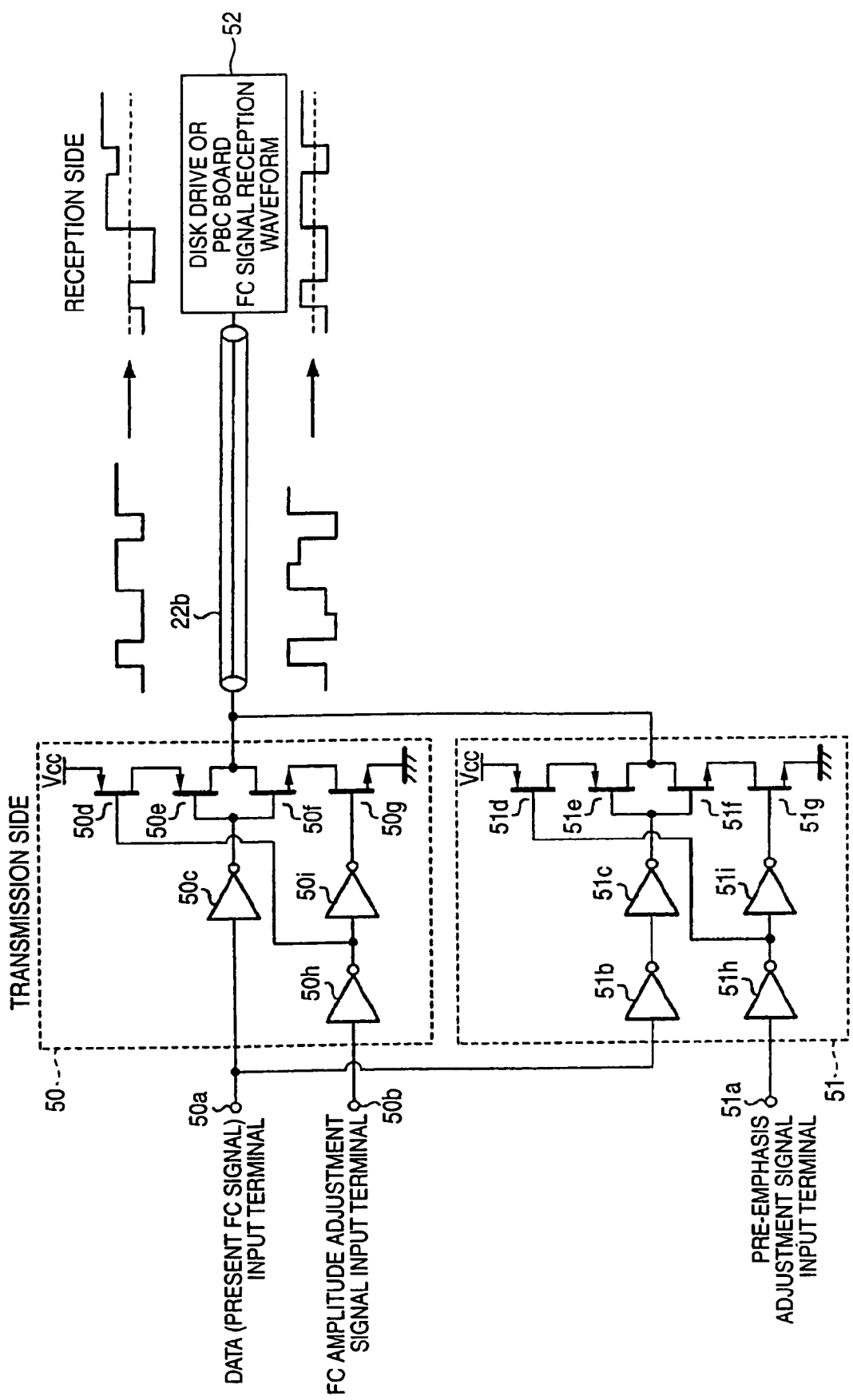
FIG. 13 is wiring diagram showing a circuit example suitable for the invention.

As shown in FIG. 13, therefore, an amplitude adjustment circuit 50 and a partial emphasis circuit (pre-emphasis circuit) 51 are disposed in this embodiment on the transmission side (on the side of the PBC boards 20a to 20d or on the side of each disk drive 4) of the data of the wiring 22b constituting the data transfer path of the rear surface substrate 22 shown in FIG. 6 to make up for the disadvantage of the difference of amplitude attenuation.

In FIG. 13, reference numeral 50a denotes a data input terminal to which the preset Fibre Channel signal (FC signal) as the data is inputted. Reference numeral 50b denotes an FC amplitude adjustment signal input terminal to which the amplitude adjustment signal corresponding to the recording wavelength of this FC signal is applied.

In this amplitude adjustment circuit 50, the data input terminal 50a is connected to the gates of P and N field effect transistors 50e and 50f the drains of which are mutually connected through an inverter circuit 50c, the source of this field effect transistor 50e is connected to the drain of the P field effect transistor 50d, the source of this field effect transistor 50d is connected to a power source terminal Vcc, the source of the field effect transistor 50f is connected to the drain of an N field effect transistor 50g and the source of this field effect transistor 50g is grounded.

An FC amplitude adjustment signal input terminal 50b is connected to the gate of the field effect transistor 50g through a series circuit of inverter circuits 50h and 50i and the junction mid point of these inverter circuits 50h and 50i is connected to the gate of the field effect transistor 50d. The junction between the collector of the field effect transistor 50e and the collector of the field effect transistor 50f is connected to the transmission end of the transfer path (wiring) 22b.

In the partial emphasis circuit (pre-emphasis circuit) 51, the data input terminal 50a is connected to the gates of P and N field effect transistors 51e and 51f the drains of which are mutually connected, through a series circuit of inverter circuits 51b and 51c, the source of the field effect transistor 51e is connected to the drain of the P field effect transistor 51d, the source of this field effect transistor 51d is connected to the power source terminal Vcc, the source of the field effect transistor 51f is connected to the drain of an N field effect transistor 51g and the source of this field effect transistor 51f is grounded.

A pre-emphasis adjustment signal input terminal 51a to which a pre-emphasis adjustment signal corresponding to the recording wavelength of the FC signal is applied is connected to the gate of the field effect transistor 51g through a series circuit of inverter circuits 51h and 51i and the junction mid point of these inverter circuits 51h and 51i is connected to the gate of the field effect transistor 51d. The junction between the collector of the field effect transistor 51e and the collector of the field effect transistor 51f is connected to the transmission end of the transfer path (wiring) 22b.

Figure 14:
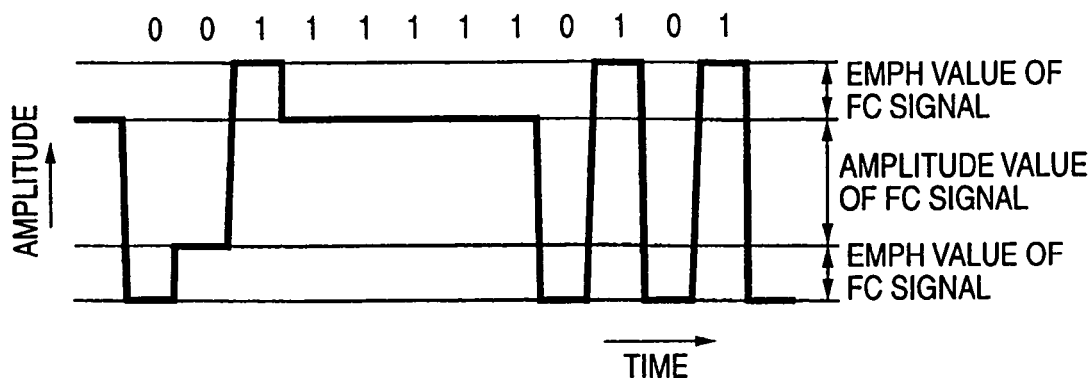
FIG. 14 is a graph useful for explaining FIG. 13.

In consequence, a transmission signal of an FC signal synthesized from the output signal of the amplitude adjustment circuit 50 and the output signal of the partial emphasis circuit 51 and shown in FIG. 14 is applied to the transmission side of the data transfer path 22b. FIG. 14 represents that the amplitude becomes greater as the recording wavelength becomes shorter and becomes smaller as the recording wavelength becomes longer.

Figure 15:
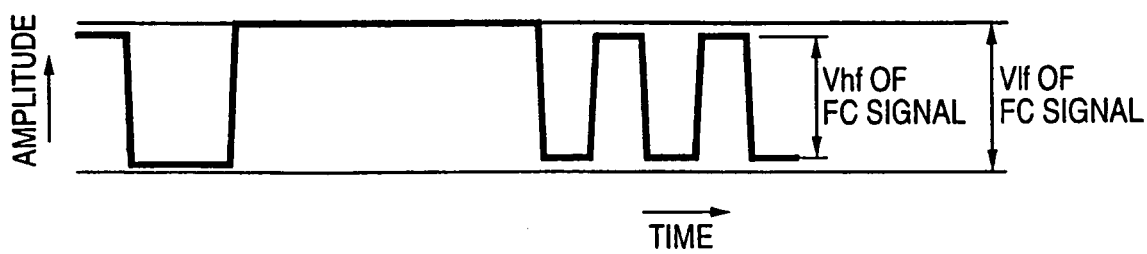
FIG. 15 is a graph useful for explaining FIG. 13.

In this case, the amplitude of the longest recording wavelength V1f of the FC signal and the amplitude of the shortest recording wavelength Vhf of the FC signal can be made substantially equal on the reception side 52 of the data transfer path 22b as shown in FIG. 15. The waveform shown in FIG. 15 represents that a satisfactory waveform can be acquired on the reception side 52 when the amplitude is adjusted in accordance with the recording wavelength shown in FIG. 14.

Therefore, when the amplitude adjustment circuit 50 and the partial emphasis circuit 51 are provided on the transmission side of the data transfer path 22b of the rear surface substrate 22 as shown in FIG. 13, signal quality can be further improved and the bit error ratio can be reduced. Furthermore, variance of signal quality among the mounting positions of the disk drives 4 can be eliminated and the disk array apparatus can cope with the use of the FC-AL loop of 4 Gbps.

Needless to say, the invention is not particularly limited to the embodiment given above but can be changed or modified in various ways without departing from the scope thereof.

What is claimed is:

1. A disk array apparatus, comprising:
   at least one group of a plurality of disk drives, the plurality of disk drives having biggest surfaces thereof alignably positioned against each other in only one line; and
   at least one circuit board which includes a plurality of Port Bypass Circuits (PBCs) and is operatively connected to each of said plurality of disk drives via a corresponding data line laid in parallel with one another in a direction perpendicular to said only one line so as to form a data path connecting to each of the plurality of disk drives thereby serially transferring data to and from the group of disk drives therethrough,
   wherein the at least one circuit board is operatively positioned to face against one side surface of each of said plurality of disk drives so as to be equidistant from each of said plurality of disk drives.

2. A disk array apparatus according to claim 1, wherein the data path includes the plurality of data lines each connected to a corresponding one of said plurality of disk drives and of substantially equal length relative to each other.

3. A disk array apparatus according to claim 1, wherein the data path of said at least one circuit board is configured as a fiber-channel loop.

4. A disk array apparatus as defined in claim 1, wherein said plurality of disk drives includes hard disk drives (FCHDD) of the Fibre Channel standard.

5. A disk array apparatus as defined in claim 1, wherein said plurality of disk drives includes hard disk drives (SATAHDD) of a serial transfer system of the ATA standard.

6. A disk array apparatus as defined in claim 2, further comprising:
   a plurality of relay connectors configured for respectively connecting each of the plurality of data lines to corresponding ones of the plurality of disk drives and dispersedly arranged in another line parallel to said only one line so as to oppose said side surface of each of said plurality of disk drives.

7. A disk array apparatus as defined in claim 2, wherein said at least one circuit board includes a plurality of multiplexers configured for respectively connecting to each of the plurality of data lines connected to corresponding ones of the plurality of disk drives, and dispersedly arranged in another line parallel to said only one line.

8. A disk array apparatus as defined in claim 6, further comprising:
   A plurality of buffer amplifiers each operatively connected between corresponding ones of the plurality of relay connectors and the plurality of data lines.

9. A disk array apparatus, comprising:
   at least one group of a plurality of disk drives, the plurality of disk drives having biggest surfaces thereof alignably positioned against each other in only one line; and
   at least one circuit board which includes a plurality of Port Bypass Circuits (PBCs) and is operatively connected to each of said plurality of disk drives via a corresponding data line laid in parallel with one another in a direction perpendicular to said only one line so as to form a data path connecting to each of the plurality of disk drives thereby serially transferring data to and from the group of disk drives therethrough,
   wherein the at least one circuit board is operatively positioned to face against one side surface of each of said plurality of disk drives such that none of the plurality of disk drives is interveningly positioned between the at least one circuit board 20 and any other one of said plurality of disk drives.

10. A disk array apparatus according to claim 9, wherein the data path includes the plurality of data lines each connected to a corresponding one of said plurality of disk drives and of substantially equal length relative to each other.

11. A disk array apparatus according to claim 9, wherein the data path of said at least one circuit board is configured as a fiber-channel loop.

12. A disk array apparatus as defined in claim 9, wherein said plurality of disk drives includes hard disk drives (FCHDD) of the Fibre Channel standard.

13. A disk array apparatus as defined in claim 9, wherein said plurality of disk drives includes hard disk drives (SATAHDD) of a serial transfer system of the ATA standard.

14. A disk array apparatus as defined in claim 10, further comprising:
   a plurality of relay connectors configured for respectively connecting each of the plurality of data lines to corresponding ones of the plurality of disk drives and dispersedly arranged in another line parallel to said only one line so as to oppose to said side surface of each of said plurality of disk drives.

15. A disk array apparatus as defined in claim 10, wherein said at least one circuit board includes a plurality of multiplexers configured for respectively connecting to each of the plurality of data lines connected to corresponding ones of the plurality of disk drives, and dispersedly arranged in another line parallel to said only one line.

16. A disk array apparatus as defined in claim 14, further comprising:
   a plurality of buffer amplifiers each operatively connected between corresponding ones of the plurality of relay connectors and the plurality of data lines.

17. A disk array apparatus, comprising:
   at least one group of a plurality of disk drives, the plurality of disk drives having biggest surfaces thereof alignably positioned against each other in only one line; and
   at least one circuit board which includes a plurality of Port Bypass Circuits (PBCs) and is operatively connected to each of said plurality of disk drives via a corresponding data line laid in parallel with one another in a direction perpendicular to said only one line so as to form a data path connecting to each of the plurality of disk drives thereby serially transferring data to and from the group of disk drives therethrough, wherein the at least one circuit board is operatively positioned to face against one side surface of each of said plurality of disk drives such that none of the plurality of disk drives is stacked with one another relative to the at least one circuit board.

18. A disk array apparatus according to claim 17, wherein the data path includes the plurality of data lines each connected to a corresponding one of said plurality of disk drives and of substantially equal length relative to each other.

19. A disk array apparatus according to claim 17, wherein the data path of said at least one circuit board is configured as a fiber-channel loop.

20. A disk array apparatus as defined in claim 17, wherein said plurality of disk drives includes hard disk drives (FCHDD) of the Fibre Channel standard.

21. A disk array apparatus as defined in claim 17, wherein said plurality of disk drives includes hard disk drives (SATAHDD) of a serial transfer system of the ATA standard.

22. A disk array apparatus as defined in claim 18, further comprising:

a plurality of relay connectors configured for respectively connecting each of the plurality of data lines to corresponding ones of the plurality of disk drives and dispersedly arranged in another line parallel to said only one line so as to oppose to said side surface of each of said plurality of disk drives.

23. A disk array apparatus as defined in claim 18, wherein said at least one circuit board includes a plurality of multiplexers configured for respectively connecting to each of the plurality of data lines connected to corresponding ones of the plurality of disk drives, and dispersedly arranged in another line parallel to said only one line.

24. A disk array apparatus as defined in claim 22, further comprising:

A plurality of buffer amplifiers each operatively connected between corresponding ones of the plurality of relay connectors and the plurality of data lines.

25. A disk array apparatus, comprising:

at least one group of a plurality of disk drives, the plurality of disk drives having biggest surfaces thereof alignably positioned against each other in only one line; and at least one circuit board which includes a plurality of Port Bypass Circuits (PBCs) and is operatively connected to each of said plurality of disk drives via a corresponding data line laid in parallel with one another in a direction perpendicular to said only one line so as to form a data path connecting to each of the plurality of disk drives thereby serially transferring data to and from the group of disk drives therethrough, wherein the at least one circuit board is operatively positioned to face against one side surface of each of said plurality of disk drives to be substantially horizontally aligned relative to said plurality of disk drives, and the data lines defined between the at least one circuit board and said each of the plurality of disk drives are substantially equal in length to each other.

* * * * *